United States Patent [19]

Fields

[11] Patent Number: 4,582,079
[45] Date of Patent: Apr. 15, 1986

[54] TELESCOPING ROD MECHANISM
[76] Inventor: Hurshel A. Fields, 3701 Union St., Eureka, Calif. 95501
[21] Appl. No.: 612,063
[22] Filed: May 18, 1984
[51] Int. Cl.[4] .......................... A61H 3/02; F16B 21/00
[52] U.S. Cl. ........................................ 135/75; 403/330
[58] Field of Search .................. 135/69, 75; 403/108, 403/322, 330, 316; 211/208, 190, 182; 248/407, 408, 409, 354.7, 297.3, 298

[56] References Cited
U.S. PATENT DOCUMENTS

| 1,703,741 | 2/1929 | Lingg | 248/408 X |
| 2,383,786 | 8/1945 | Gish | 135/69 |
| 2,960,095 | 11/1960 | Smith, Jr. | 135/69 X |
| 4,355,917 | 10/1982 | Bunger | 403/330 X |

FOREIGN PATENT DOCUMENTS

| 478420 | 11/1951 | Canada | 403/330 |
| 2327270 | 5/1974 | Fed. Rep. of Germany | 135/75 |

Primary Examiner—Robert A. Hafer
Assistant Examiner—Arnold W. Kramer
Attorney, Agent, or Firm—Leonard D. Schappert

[57] ABSTRACT

A telescoping rod mechanism having a latch mechanism the tension of which is continuously adjustable over a preset range and which, in one embodiment, is adjustable while the device is in use.

4 Claims, 9 Drawing Figures

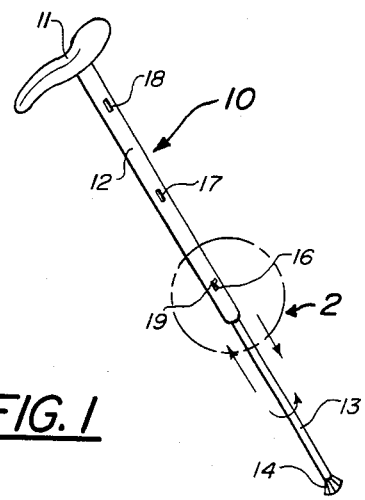
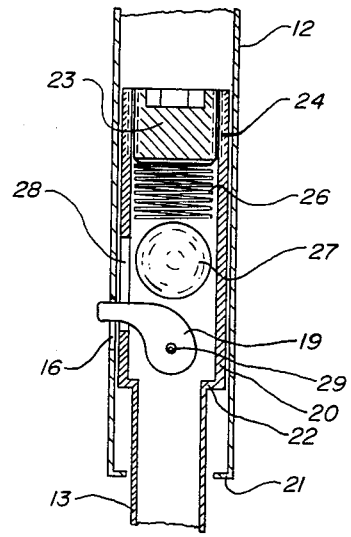
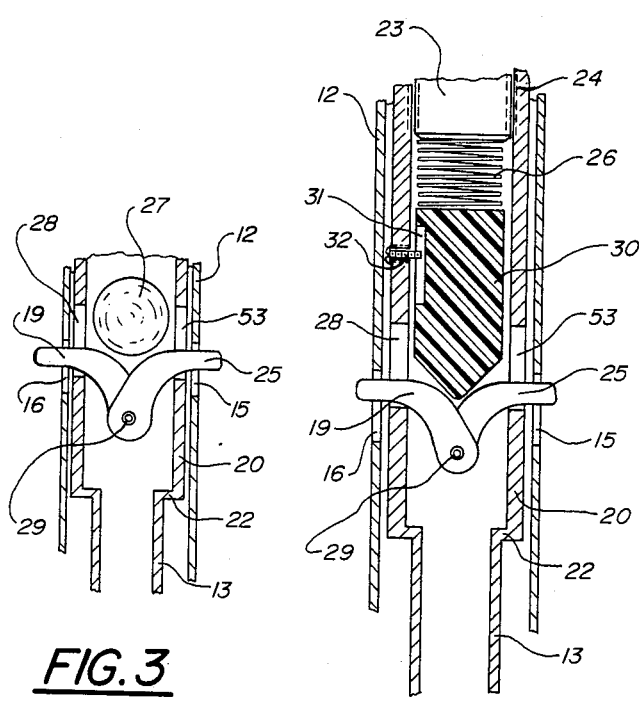

TELESCOPING ROD MECHANISM

BACKGROUND OF THE INVENTION

1. Field of the Invention

This invention relates generally to latch mechanisms and, more specifically, to telescoping rod mechanisms which utilize latches to lock them in position.

2. Description of the Prior Art

Telescoping rods have been incorporated into various devices, including drapery rods, umbrellas and supports for doors, and have been used in many other situations where length needs to be variable depending upon the surrounding conditions. Telescoping rods have included a variety of latch mechanisms to hold them in place once extended. Most such latch mechanisms are designed not to be repaired once built; rather, the units in which they are used are normally discarded and replaced when the latch mechanism fails. None of the prior art of which applicant is aware teaches the unique structure taught by the present invention.

SUMMARY OF THE INVENTION

The present invention consists of a telescoping rod mechanism having an unique latch mechanism, including means for adjusting tension on the latch, which makes the telescoping rod mechanism usable on walking canes and in other applications where expense of production is less important than is reliability.

One of the objects of the present invention is to provide a sturdy and reliable telescoping rod mechanism.

Another object of the present invention is to provide a telescoping rod mechanism which includes adjustment means which make it possible to vary the tension required to unlatch the telescoping rod mechanism.

A further object of the present invention is to provide a telescoping rod mechanism in which the latch may be locked rigidly once the proper length is reached.

A further object of the present invention is to provide a telescoping rod mechanism which, because of its construction, is relatively easily repaired in the event of latch wear or damage.

A further object of the present invention is to provide a telescoping rod mechanism having a latch mechanism the tension of which is continuously adjustable over a predetermined range.

A further object of the present invention is to provide a telescoping rod mechanism which, under normal circumstances, is maintenance-free.

The foregoing objects, as well as further objects and benefits of the present invention, are made more evident by the descriptions and claims which follow.

BRIEF DESCRIPTION OF THE DRAWINGS

FIG. 1 is a perspective view of a walking cane utilizing the telescoping rod mechanism taught herein.

FIG. 2 is an expanded cross-sectional view of the encircled area in FIG. 1 referred to as "2."

FIG. 3 is a cross-sectional view showing a latch mechanism alternative to that shown in FIG. 2.

FIG. 4 is a cross-sectional view showing a latch mechanism alternative to those shown in FIGS. 2 and 3.

DESCRIPTION OF THE PREFERRED EMBODIMENT

Figure 5:
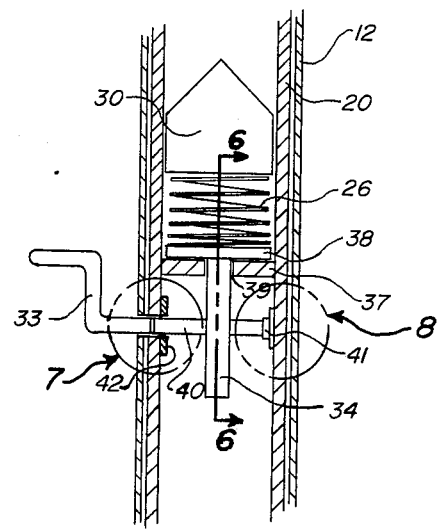
FIG. 5 is a cross-sectional view of the telescoping rod mechanism showing the particulars of means for adjusting the tension of the latch.
Figure 6:
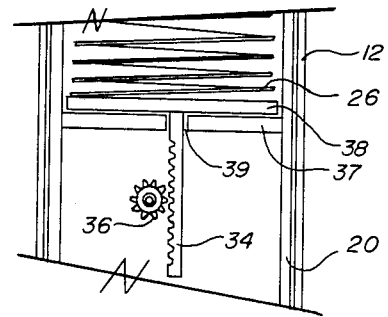
FIG. 6 is an expanded cross-sectional view taken along lines 6—6 of FIG. 5.

FIG. 1 of the drawings shows a complete cane 10 which utilizes the unique latch mechanism set forth herein and taught by the following views of the drawings. When the latch mechanism is used with cane 10, it is positioned in the encircled area referred to as "2" in FIG. 1, and it latches rod 13 into position with respect to hollow rod 12. Holes 16, 17 and 18 in hollow rod 12 are provided so that the position of rod 13 with respect to hollow rod 12 may be adjusted. Latch 19, when locked into hole 16, 17 or 18, holds rod 13 in position. Handle 11 is provided so that cane 10 may be comfortably used as a walking cane, and a rubber shoe 14 is provided to prevent rod 13 from marring a floor.

FIG. 2 is a cross-sectional view of the encircled area referred to as "2" in FIG. 1. Latch 19, which pivots on pin 29 with respect to rod 13, is shown protruding through hole 16 in hollow rod 12, thereby holding hollow rod 12 rigid with respect to rod 13. Rod 13 is hollow as shown to facilitate the placement of latch 19, sphere 27, spring 26 and tension screw 23. Rod 13 is further expanded at 22 so that the expanded section 20 fits snugly into hollow rod 12. Rod 13 and expanded section 20 of rod 13 are prevented from slipping out of hollow rod 12 by lip 21. Latch 19 is held in position in hole 16 and hole 28 by tension brought to bear by the combination of tension screw 23, sphere 27 and spring 26. To reset the overall length of cane 10, the operator pulls hollow rod 12 upward on rod 13 and, as soon as latch 19 clears the inside of hollow rod 12, turns rod 13 as shown in FIG. 1, thus enabling rod 13 to enter hollow rod 12 without engaging latch 19 with hole 16. Holes 17 and 18 in FIG. 1 are provided so that, when latch 19 engages either of them, the overall length is set thereby. Tension screw 23 in this embodiment consists of a threaded hex screw which threads to threaded area 24 of expanded section 20 of rod 13. The tension of spring 26 on sphere 27 and, ultimately, upon latch 19, is increased or decreased when tension screw 23 is screwed in or out.

FIGS. 3 and 4 of the drawings show alternative latch mechanisms which include latch 25 in addition to latch 19, thereby providing for positive locking of the position of rod 13 with respect to hollow rod 12. Hole 53 in expanded section 20 of rod 13 is required in these embodiments, as are hole 15 in hollow rod 12 and other holes corresponding to holes 17 and 18 in hollow rod 12 shown in FIG. 1. As shown in FIG. 3, sphere 27 remains unchanged, and the tension means utilized to maintain tension on latches 19 and 25 is substantially that shown in FIG. 2. FIG. 4 shows alternative tension means which replace sphere 27 with a wedge 30. Wedge 30 has a slot 31 to accept the threaded end of lock screw 32, which is positioned in expanded section 20 of rod 13. Lock screw 32 holds wedge 30 in position so that it does not rotate within expanded section 20 of rod 13. The remaining tension means, which include spring 26 and tension screw 23, are substantially as shown in FIG. 2.

FIGS. 5 through 9 show continuously adjustable tension means so designed and structured that the tension on latch 19 and/or latches 19 and 25 can be adjusted over a continuous range from the outside of rods 12 and 13 so that, when such is desirable, wedge 30 or sphere 27 can be compacted against latch 19 or latches 19 and 25 to hold latches 19 or latches 19 and 25 stationary.

Figure 7:
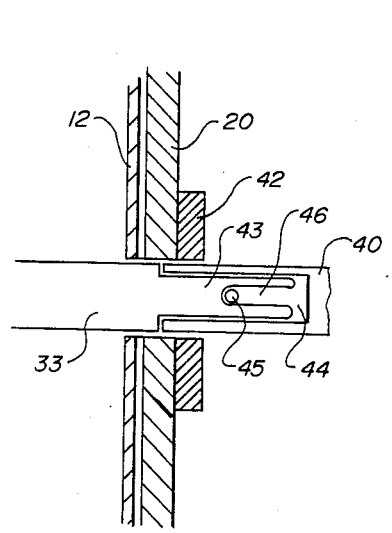
FIG. 7 is an expanded view of the encircled area in FIG. 5 referred to as "7."
Figure 8:
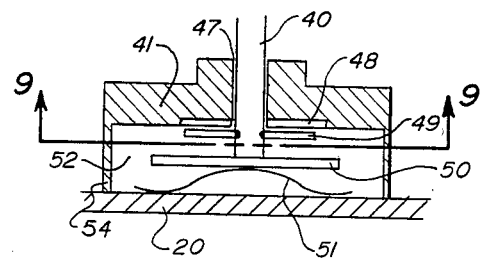
FIG. 8 is an expanded view of the encircled area in FIG. 5 referred to as "8."
Figure 9:
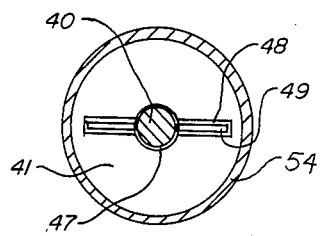
FIG. 9 is a cross-sectional view taken along lines 9—9 of FIG. 8.

Specifically, FIG. 5 shows a cross-sectional view of the tension-producing portion of the latch mechanism. Viewing FIG. 6 concurrently reveals that rod 40 is attached to pinion 36. Crank 33, which attaches to rod 40, is provided to facilitate external adjustment of tension on wedge 30. As pinion 36 turns, it engages rack 34 and moves it laterally through hole 39 of support 37. Support 37 is rigidly attached to the inner wall of expanded section 20 of rod 13, and is designed to support rack 34. Disc 38 is attached to the end of rack 34, as shown, and abuts against spring 26, thereby distributing force created by lateral movement of rack 34 over substantially the whole area of spring 26. Rod 40, which extends through and is rigidly attached to pinion 36, is supported at one end by bearing 41 and at the other end by bearing 42, which are rigidly attached to the inside of expanded section 20 of rod 13. As is shown in FIG. 7, hole 44 in rod 40 is provided to facilitate insertion and locking of crank 33 with respect to rod 40. Crank 33 has a slot 46 cut into reduced section 43 of crank 33, designed to slip over pin 45, which is rigidly attached to rod 40. When crank 33 is not in position, pinion 36 and rack 34, and consequently spring 26 and wedge 30, are held stationary by a spring-loaded locking mechanism shown in FIGS. 8 and 9. The locking mechanism shown in FIG. 8 is located in that area encircled and referred to as "8" in FIG. 5. Disc 50 is rigidly attached to the end of rod 40 and is spring-loaded against the inner wall of expanded section 20 of rod 13 so that, when no lateral pressure is applied from crank 33, the tension of spring 51 on disc 50 pushes rod 40 laterally until pin 49, which is rigidly attached to and extends through rod 40, slips into slot 48 of bushing 41. The size and shape of pin 49, as well as its operation with respect to slot 48, are made clearer in FIG. 9 of the drawings. Bushing 41 is rigidly attached to the inner wall of expanded section 20 of rod 13 by walls 54, and hole 52 is provided to facilitate the placement of disc 50, spring 51 and pin 49.

In order to adjust the tension of wedge 30, the operator inserts crank 33 into hole 44 of rod 40, thereby engaging pin 45. Then lateral pressure is applied to disengage pin 49 from slot 48. Once pin 49 is disengaged from slot 48, crank 33 can be turned either clockwise or counterclockwise, depending on whether an increase or a decrease in tension is required. When lateral pressure on crank 33 is relieved, pin 49 slips back into slot 48, locking the position of pinion 36 and rack 34 and, consequently, of latches 19 and 25.

While the foregoing description of the invention has shown preferred embodiments using specific terms, such description is presented for illustrative purposes only. It is applicant's intention that changes and variations may be made without departure from the spirit or scope of the following claims, and this disclosure is not intended to limit applicant's protection in any way.

I claim:

1. A telescoping rod mechanism, comprising:
   a first rod which is hollow, having at least one hole in the wall thereof;
   a second rod, slidable in said first rod, having a hollow section therein with at least one hole in the wall thereof, and
   a latch mechanism, having:
      pivot means positioned inside of said hollow section of said second rod;
      a latch positioned inside of and pivotally attached to said pivot means inside of said hollow section of said second rod so that said latch is extensible through said hole in said wall of said second rod and said hole in said wall of said first rod, said latch being so shaped and said pivot means being so offset from said hole in said wall of said second rod that, when said latch is extended through said hole in said wall of said second rod and said hole in said wall of said first rod, said second rod is restrained from sliding farther into said first rod but is free to slide out of said first rod, and
   compression means positioned inside said hollow section of said second rod, consisting substantially of:
      a spring;
      compression transfer means positioned between said latch and said spring and acting on said latch so that said latch is held in position in said hole in said wall of said second rod and extends into said hole in said wall of said first rod when said hole in said wall of said first rod and said hole in said wall of said second rod are aligned with each other, and
      compression adjusting means whereby the force which said spring exerts on said compression transfer means is adjustable.

2. The invention of claim 1, wherein said compression transfer means consists of a sphere.

3. The invention of claim 2, wherein said compression adjusting means includes a threaded rod screwed into said hollow section of said second rod so that the compression of said spring is adjusted when said threaded rod is screwed in or out.

4. The invention of claim 1, wherein said compression adjusting means includes a threaded rod screwed into said hollow section of said second rod so that the compression of said spring is adjusted when said threaded rod is screwed in or out.

* * * * *